No. 882,108. PATENTED MAR. 17, 1908.
W. HAMILTON.
BRAKE BEAM HANGER.
APPLICATION FILED OCT. 11, 1907.
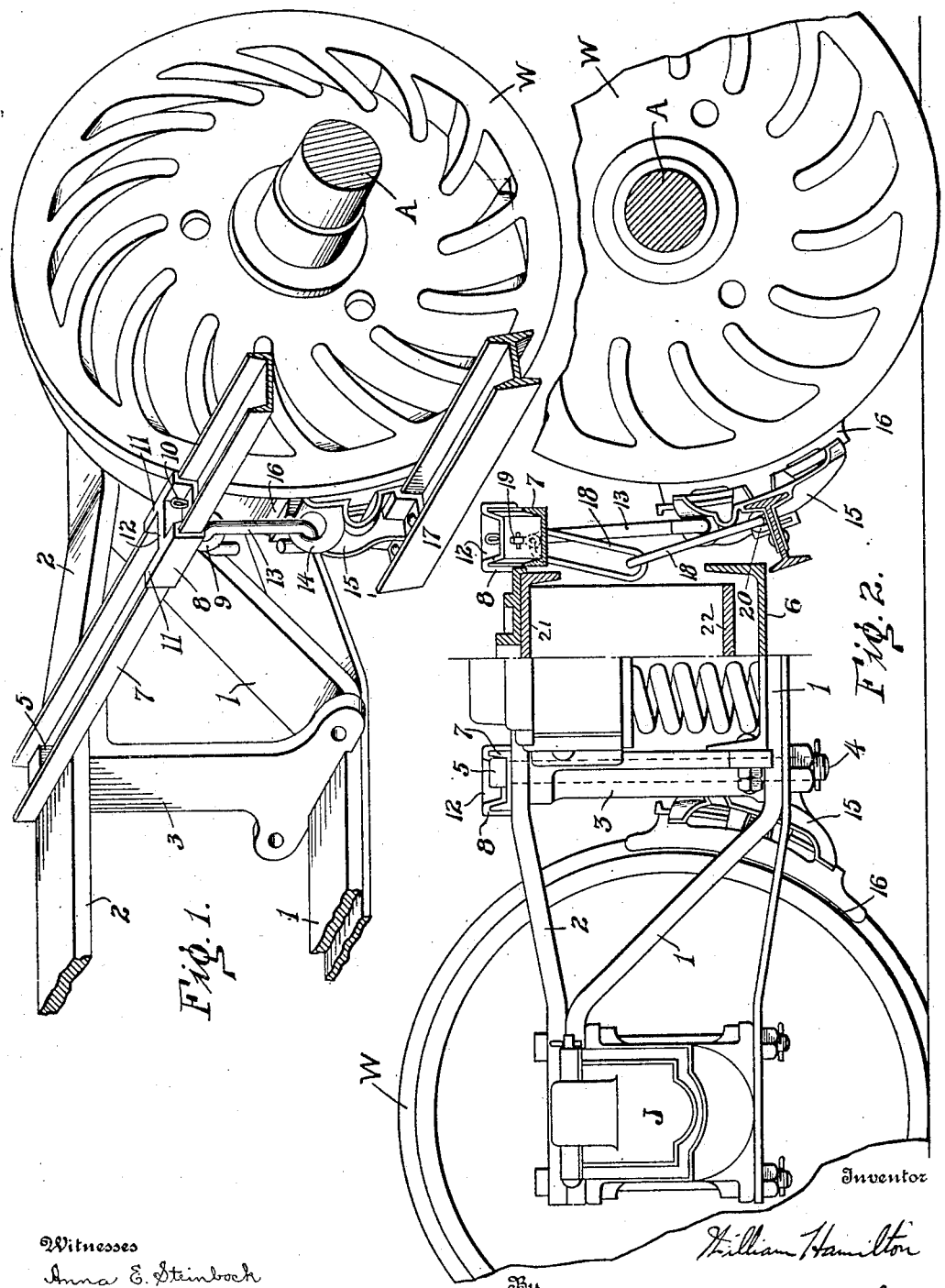

UNITED STATES PATENT OFFICE.

WILLIAM HAMILTON, OF ERIE, PENNSYLVANIA.

BRAKE-BEAM HANGER.

No. 882,108.     Specification of Letters Patent.     Patented March 17, 1908.

Application filed October 11, 1907. Serial No. 396,893.

*To all whom it may concern:*

Be it known that I, WILLIAM HAMILTON, a citizen of the United States, residing in the city and county of Erie, State of Pennsylvania, have invented a new and useful Brake-Beam Hanger, of which the following is a specification.

My invention relates to a brake beam hanger for use in connection with railway car trucks.

My invention resides in a brake beam hanger which comprises, in part, a preferably rolled metal section which ties together the top arch bars of a truck and which may serve also to lock the column bolts.

It is the object of my invention to provide a brake beam hanger and truck construction which shall be of the utmost simplicity, easy of assemblage, and most effective in strengthening the truck as a whole. To this end, I provide a tie member, such as a rolled metal section, preferably channel iron, which is held under the column bolt heads and which extends from one top arch bar to the other of a truck, thus tying the top arch bars together and greatly stiffening and strengthening the truck laterally. When a channel or other convenient section is employed, the same may be used as a lock to prevent the column bolts from turning. This construction provides also a convenient means for attachment and support for the brake beam and its safety chains.

My invention resides in the features hereinafter described and pointed out in the claims.

For an illustration of one of the forms my invention may take, reference is to be had to the accompanying drawing, in which:

Figure 1 is a fragmentary perspective view of truck and brake beam hanger. Fig. 2 is a side view of the truck and brake beam hanger, some parts being shown in section.

In the drawing, A represents the axle which carries at each end a car wheel W.

Supported upon the journal box J are the truck arch bars 1 and 2, the upper one being styled the top arch bar. Separating the arch bars 1 and 2 are the cast columns 3, column bolts 4 with heads 5 extending through the same and secured beneath the lower arch bar by nuts and cotter pins. Extending across from the lower arch bar 1 on one side of the truck to the other arch bar 1 on the other side of the truck is a channel iron 6 secured at both ends to the bottoms of the columns 3, the channel iron 6 serving as the spring plank of the truck bolster, the latter comprising members 21 and 22.

The brake beam hanger is shown as a channel iron 7 drilled and chamfered and held under the column bolt heads 5, there being two hanger beams 7 for each truck, one for each pair of wheels. A hanger member 8, preferably of cast iron, is cored out to embrace and conform to the outline of the beam 7 and to slide over it and has, on its under side, an eye 9. A cotter pin 10 extends through the hanger member 8 and the channel 7 to prevent longitudinal movement of the hanger member 8. The hanger member has two wing portions 11 which slide over the flanges of the channel 7 and which are tied together by a web 12 for strengthening purposes.

In the eye 9 of the hanger member engages the hanger hook 13 which in turn engages at its lower end in the eye 14 of the brake head 15, the latter carrying the brake shoe 16, the brake heads of a pair being secured to the brake beam 17 which is here shown as a rolled section, an I beam.

The safety chains 18 engage in eye bolts 19 at their upper ends in the hanger beam 7 and in the eyes 20 at their lower ends.

From the construction described, there results a truck whose lower arch bars are tied by the spring plank channel 6, and whose top arch bars are tied by the two hanger beams 7, thus producing a greatly stiffened truck, the hanger beams 7 serving also as a lock for the column bolts and as a means for hanging or supporting the brake beam and its attachments.

The construction is of the utmost simplicity and all loose pieces, or pieces likely to become loose, are entirely dispensed with, thus minimizing the danger to the truck or car from parts jarring and shaking apart during use.

What I claim is:

1. In a car truck, the combination with the side arch bars, of column bolts, a transversely extending member secured by said column bolts and tying the top arch bars, said column bolts prevented from loosening by said member, and a brake hung from said member.

2. In a car truck, the combination with the side arch bars, of separating columns therefor, column bolts, a transversely extending member secured by said column bolts and tying the top arch bars and preventing said bolts from loosening, and a brake shoe hung from said transversely extending member.

3. In a car truck, the combination with the side arch bars, of separating columns therefor, column bolts, a transversely extending channel iron secured by said column bolts and tying the top arch bars, a hanger member on said channel iron, and a brake beam and brake shoes hung from said hanger member.

4. In a car truck, the combination with the side arch bars, of column bolts, a transversely extending channel iron secured by said column bolts and tying the top arch bars, said channel iron serving as a lock to prevent rotation of said column bolts.

5. In a car truck, the combination with the side arch bars, of column bolts, a transversely extending channel iron, said column bolts passing through said channel iron to secure the same to the top arch bars, whereby the top arch bars are tied, the heads of said column bolts engaging a flange of said channel iron to prevent rotation of said column bolts.

6. In a car truck, the combination with the side arch bars, of separating columns therefor, column bolts, a transversely extending member secured by said column bolts to tie the top arch bars, a hanger member having an eye secured upon said transversely extending member, a hanger hook engaging in said eye, and a brake supported by said hanger hook.

7. In a car truck, the combination with a transversely extending brake beam hanger, of a hanger member embracing said hanger and conforming to the outline thereof, an eye upon said hanger member, a hanger hook engaging in said eye, and a brake head supported by said hanger hook.

8. In a car truck, the combination with the side arch bars, of a transversely extending brake beam hanger tying the top arch bars, a hanger member embracing and conforming to the outline of said brake beam hanger and secured thereto, and a brake head supported by said hanger member.

9. In a car truck, the combination with the side arch bars, of a transversely extending brake beam hanger secured to the top arch bars to tie the same, a pair of hanger members embracing and conforming to the outline of said brake beam hanger and secured thereto, a brake head supported by each hanger member, and an I beam or the like joining said brake heads.

10. In a car truck, the combination with the side arch bars, of a pair of separating columns and of column bolts for each pair of said arch bars, two transversely extending members secured by said column bolts and tying the top arch bars, and a brake beam and shoe suspended from each of said transversely extending members.

11. In a car truck, the combination with the side arch bars, of column bolts, a transversely extending member secured by said column bolts and tying the top arch bars, said transversely extending member serving as a lock to prevent loosening of said column bolts.

12. In a car truck, the combination with a hanger beam, of a hanger member slidable thereon and consisting of a mass having an opening therethrough conforming substantially to the outline of the hanger beam.

13. In a car truck, the combination with a hanger beam, of a hanger member, the latter consisting of a casting having a cored perforation conforming substantially to the outline of said hanger beam.

14. In a car truck, the combination with a hanger beam consisting of a rolled section, of a hanger member consisting of a casting slidable upon said hanger beam, and having a cored perforation conforming substantially to the outline of said rolled section.

15. In a car truck, the combination with a hanger beam consisting of a rolled section, of a hanger member consisting of a casting embracing the web and flange members of said hanger beam, and a stiffening web integral with a portion of said casting embracing a flange of the rolled section.

In testimony whereof I have hereunto affixed my signature in the presence of the two subscribing witnesses.

WM. HAMILTON.

Witnesses:
JOHN G. KUHN,
R. L. GORDON.